A. H. TOWLE.
VEHICLE WHEEL.
APPLICATION FILED APR. 29, 1907.
951,384.
Patented Mar. 8, 1910.
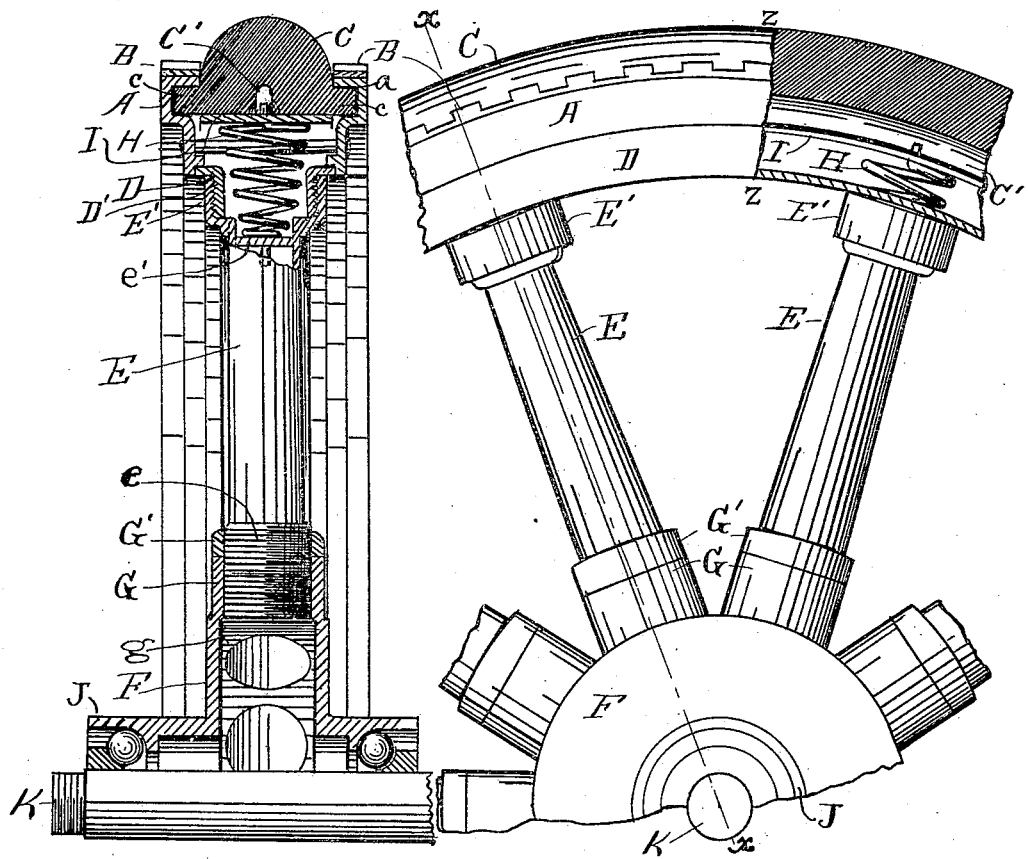
Fig. 1.
Fig. 2.
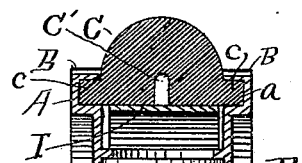
Fig. 3.
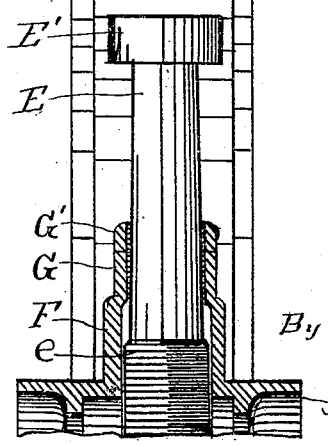
Witnesses
J. L. Clark
E. J. Noble
Inventor
Arlen H. Towle
By Ithiel J. Gilley
Attorney

UNITED STATES PATENT OFFICE.

ARLEN HARVEY TOWLE, OF LANSING, MICHIGAN.

VEHICLE-WHEEL.

951,384.  Specification of Letters Patent.  Patented Mar. 8, 1910.

Application filed April 29, 1907. Serial No. 371,017.

*To all whom it may concern:*

Be it known that I, ARLEN H. TOWLE, a citizen of the United States, residing at Lansing, in the county of Ingham and State of Michigan, have invented certain new and useful Improvements in Vehicle-Wheels, of which the following is a specification.

My invention relates to improvements in vehicle wheels, and more particularly to automobile wheels, and its objects are: First, to provide the maximum of resiliency and at the same time dispense with the use of pneumatic tires. Second, to provide a vehicle wheel with which the spoke may be easily removed from its connection with the felly or rim for the purpose of adjusting the springs, or other means of producing resiliency, without affecting the general construction of the wheel or affecting any spoke except the one being removed. Third, to provide a means for facilitating traction when traveling in sand or other soft soil, and, fourth, to provide a means for firmly securing the spokes in place when the wheel is properly assembled. I attain these objects by the mechanism illustrated in the accompanying drawing in which—

Figure 1 is a sectional elevation of a wheel on the line $x$ $x$ of Fig. 2, showing the position of the spiral spring in the rim, Fig. 2 is a side elevation of the same, and Fig. 3 is a sectional elevation of the same showing the spoke disconnected from the rim and dropped down so that the spring shown in Fig. 1 may be readily removed.

Similar letters refer to similar parts throughout the several views.

A represents the rim of the wheel, which is composed of two annular rims so constructed that one will rest upon each edge, and lap over upon the periphery of the felly D, where they are firmly clamped to place, and the completed rim is provided with lateral grooves $a$ $a$ arranged to receive the projecting edges $c$ $c$ of the hard rubber tire C, all as shown in Figs. 1 and 3, to hold this tire firmly to place. The rim A has an auxiliary rim or felly D that is provided with inwardly projecting thimbles that are screw threaded on the outer surface to receive the internally threaded upper end of the spoke E, as indicated at D′, E′ in Fig. 1.

For the purpose of producing the desired resiliency in the rim of the wheel I place an annular steel tire I in the rim under the hard rubber tire C, which tire, acting alone under the rubber tire, would give resiliency to the wheel in much the same manner that a barrel hoop will rebound if pressure is placed upon the top surface of the periphery with the lower surface resting on the ground, and to increase and sustain this resiliency I place a series of spiral or conical springs, as H, upon a partition $e′$ in the spoke E with the opposite end pressing strongly against the lower or inner surface of the steel tire I, so that an equal tension is exercised upon the inner surface of this tire opposite the ends of each spoke in the wheel. I have cut the rim and tire of the wheel away at $z$ $z$ in Fig. 2 to show a side view of the connection between the spring H and the tire I.

J represents the hub of a wheel, K, the end of the axletree and F is a flange extending out from the hub. The flange F is hollow and has a thimble G radiating from it wherever a spoke is to be placed. These thimbles are screw threaded in their inner surface, to mesh with the threads $e$ in the outer surface of the lower end of the spokes E, so that the spoke may be screwed down. as indicated in Fig. 3, low enough to disconnect the upper end E′ from the thimble D′ and leave sufficient space between the two to allow the spring H to be readily removed or reinserted, or other repairs to be made adjacent to the thimbles D′.

The appliance for facilitating travel in sand or other soft soil consists of a serrated or notched tire or rim, B, either integral with, or shrunk upon the rim A in such a manner that the hard rubber felly C will carry the load when the vehicle is traveling over hard roads but the moment a soft piece of road is reached the auxiliary tires or traction surfaces B B will assist to carry the load and avert the danger of the wheel pressing deeply into the soil.

To avert the danger of the spokes getting loose and screwing back into the thimbles G I place upon each one of the spokes a jam nut G′ designed to act against the end of the corresponding thimble.

$g$ represents the hollow of the flange F, which is open from the lower end of the thimbles G to the axletree as indicated in Figs. 1 and 3.

The groove C′, in the center of the hard rubber tire C, is designed to allow the lower surface of the tire to expand or spread sidewise when weight is placed upon the periphery of the tire, and thus force the sides *c c* solidly into the grooves *a a* in the sides of the tire or rim A, which assists greatly in averting the danger of the rubber tire slipping or creeping in these grooves, and to further avert this danger any of the well known means or devices in use for the purpose, may be applied.

Having thus fully described my invention, what I claim as new and desire to secure by Letters Patent of the United States, is:—

1. In combination, a wheel hub having a hollow flange thereon, thimbles radiating therefrom and screw threaded in the inner surface, spokes having one end screw threaded on the outer surface to engage the screw thread in the thimbles before mentioned, an internally threaded cup at the other end of the spoke, a wheel rim having the periphery open and lateral slots therein, a felly having thimbles projecting inward and screw threaded to engage the cups on the spokes, an annular steel tire suspended within the rim, springs for supporting the steel tire, and a hard rubber tire supported by the steel tire and having wings engaging the lateral slots in the rim, substantially as and for the purpose set forth.

2. In combination, a wheel hub having radiating thimbles screw threaded on the inner surface, spokes screw-threaded on the outer surface to engage the screw thread in the thimbles, and jam nuts connected therewith; a hollow rim open around the periphery and having lateral grooves, thimbles projecting in from the rim and screw-threaded, cups on the ends of the spokes screw threaded to engage the thimbles on the rim, an annular steel tire within the rim, a spiral spring projecting from the end of each spoke and supporting the steel tire, and a hard rubber tire supported in the grooves in the rim and by the steel tire, and having a deep groove the entire length of its inner surface.

3. In combination with the hub and felly of a vehicle wheel an annular rim secured to each side of the felly, each rim constructed to form a groove at its inner side, an annular spring metal tire supported between the rims with its outer surface in alinement with the inner walls of the grooves, springs for supporting the metal tire, a flexible tire encircling the metal tire and having wings projecting from its sides to enter the grooves in the rims and be forced firmly therein by pressure on its periphery, and removable spokes engaging the hub and the felly.

4. In combination, a hub having radiating thimbles screw threaded inside, and open to the center of the hub, a hollow rim having side grooves, thimbles projecting in from the rim, spokes having screw threads on the outer surface at one end to engage the screw threads in the thimbles on the hub and provide for longitudinal movement, cups at the other end screw threaded inside to engage the screw threads on the thimbles on the rim, a resilient tire supported in the rim, and an auxiliary traction tire each side of the resilient tire substantially as and for the purpose set forth.

Signed at Lansing Michigan April 23d 1907.

ARLEN HARVEY TOWLE.

In presence of—
CLAUDE A. BAKER,
CHAS. S. EMERY.